United States Patent Office 3,350,177
Patented Oct. 31, 1967

---

3,350,177
PREPARATION OF SODIUM BOROAZIDE
John J. Finn, Chicago, and James N. Keith, Villa Park, Ill., assignors to the United States of America as represented by the Secretary of the Air Force
No Drawing. Filed Jan. 3, 1964, Ser. No. 336,100
7 Claims. (Cl. 23—358)

This invention concerns boroazides and, more particularly, discloses a convenient and an economical way of making boroazides, of which the alkali metal boroazides: lithium boroazide $LiB(N_3)_4$ and sodium boroazide $NaB(N_3)_4$ are illustrative examples. The boroazides are used as additives to propellants.

In the past, the making of boroazides has started with a boron hydride such as diborane $(B_2H_6)$, as in the examples:

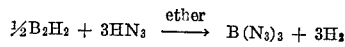

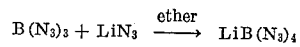

or the borohydrides:

(1) 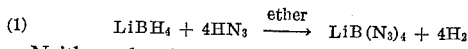

Neither the borohydrides nor anyhdrous hydrogen azide are readily available. The borohydrides are expensive.

The object of this invention is to provide the disclosed synthesis of sodium boroazide from sodium azide and boron trifluoride in tetrahydrofuran. Tetrahydrofuran or tetramethylene oxide is a good solvent for boron trifluoride and for sodium boroazide.

It has been found that azidization occurs slowly at the room temperature of about 22° C. and at about one atmosphere of pressure, and that it occurs fairly rapidly at 65° C., which is the boiling point of tetrahydrofuran, that also is designated herein for brevity as (THF), according to the equation:

(1) 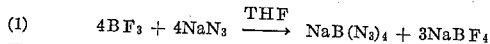

Tetrahydrofuran as solvent is preferred since the other solvents used experimentally: nitriles, nitromethane, and dioxane, resulted in the loss of much of the azide through side reactions. Attempts to azidize boron tribromide failed in non-polar solvents, such as bromobenzene or phenyl bromide $C_6H_5Br$. Also the attempts were accompanied by the loss of the azide in nitriles.

The method for preparing boroazides that is disclosed herein theoretically can be extended to include the alkali boroazides and probably boroazides of other metals as well.

Example 1

In the first example, 0.7 mmole of boron trifluoride $BF_3$, are mixed with 3.1 mmoles of sodium azide $NaN_3$, and with 25 ml. of tetrahydrofuran that has been previously dried with calcium hydride $CaH_2$. An inert gas atmosphere such as of argon, is maintained in the reactor as its contents are refluxed for 21 days. Analysis of the tetrahydrofuran liquor that results from the refluxing operation shows that it contains 26.5 mg. $N_3$ per 25 ml. of liquor.

The solubility of sodium azide $NaN_3$ in tetrahydrofuran is 200 mg. per liter. The amount of sodium boroazide in the refluxed liquor is five times more than what would be expected for sodium azide dissolved in the tetrahydrofuran. The conversion, based on the above Equation 1, is 76% of the theoretical purified product.

Example 2

In the second example 8.7 mmoles of boron trifluoride $BF_3$ are introduced into a reactor with 31 mmoles of sodium azide $NaN_3$ and with 50 ml. of calcium hydride $CaH_2$ dried tetrahydrofuran, and the solution in the reactor is refluxed under argon for 30 days at the minimum refluxing temperature.

The analysis of the refluxed tetrahydrofuran liquor shows the presence in the liquor of 273 mg. $N_3$, 27 mg boron, 4.5 mg. F and 40 mg. Na. The presence in the liquor of $NaBF_4$, and, correcting for the solubility of sodium azide $NaN_3$ in tetrahydrofuran, supports the composition product as $NaB_{1.5}(N_3)_{3.93}$. This composition is significant when the reliability of boron analysis in the presence of fluoride is considered. The yield is about 80% by weight.

Example 3

In the third example, 33.7 mmoles of boron trifluoride are introduced into an argon flushed reactor with 145 mmoles of sodium azide and with 250 ml. of tetrahydrofuran that has been previously dried with calcium-hydride and is heated to reflux under argon.

The minimum reaction time that is required for accomplishing the completion of the reaction is determined by the periodical sampling of the reactants, analysing the samples for their azide content. The results experimentally establish that the reaction goes to 78.5% of completion at the end of two days continuous refluxing.

It is to be understood that this invention has been presented from the findings of successful experimentation and that similarly operating modifications in reactants, quantities, temperatures, times and procedural steps may be made without departing from the spirit and the scope of the present invention.

We claim:

1. The method of making an alkali metal boroazide by combining in an inert gas flushed reactor at about 22° C. with a solvent of the reactants boron trifluoride and sodium azide in predetermined molal proportions, increasing the temperature of the solution of reactants in accomplishing the reaction between the boron trifluoride and the sodium azide by a refluxing operation, and recovering the sodium boroazide product.

2. The method of making sodium boroazide by combining as reactants in an inert gas flushed reactor predetermined molal proportions of sodium azide and of boron trifluoride in a mutual solvent, refluxing the solution under the inert gas in accomplishing the reaction between the sodium azide and the boron tetrafluoride in forming sodium boroazide as product, and recovering the product.

3. The process of making sodium boroazide by adding together in a refluxing reactor predetermined molal proportions of boron trifluoride and sodium azide, adding to the reactor a refluxing quantity of tetrahydrofuran as solvent, flushing the reactor with argon, refluxing the solution under argon in accomplishing the formation of sodium boroazide, and recovering the sodium boroazide.

4. The process defined in claim 3 wherein the proportion in which the reactants are combined is within the range of from 0.7 mmole to 33.7 mmoles of boron trifluoride, to form 3.1 mmoles to 145 mmoles of sodium azide.

5. The process of combining at room temperature 0.7 mmole of boron trifluoride with 3.1 mmoles of sodium azide and with 25 ml. of tetrahydrofuran previously dried with calcium hydride, and refluxing the solution under argon in making sodium boroazide.

6. The process of combining at room temperature in a refluxing reaction 8.7 mmoles of boron trifluroide with 31 mmoles of sodium azide with 50 ml. of dry tetrahydrofuran, and refluxing under argon the contents of the reactor in forming sodium boroazide.

7. The process of mixing in a refluxing reactor 33.7 mmoles of boron trifluoride and 145 mmoles of sodium azide and 250 ml. of tetrahydrofuran, and refluxing under agon the contents of the reactor in forming sodium boroazide.

References Cited

Chemical Abstracts, volume 49, columns 767 and 768 (1955).

MILTON WEISSMAN, *Primary Examiner.*